F. HEAVENER.
Clothes-Line Reel.

No. 210,532. Patented Dec. 3, 1878.

WITNESSES:
W. W. Hollingsworth
Edw. W. Byrn

INVENTOR:
F. Heavener
BY
ATTORNEYS.

UNITED STATES PATENT OFFICE.

FLOYD HEAVENER, OF LARAMIE CITY, WYOMING TERRITORY.

IMPROVEMENT IN CLOTHES-LINE REELS.

Specification forming part of Letters Patent No. 210,532, dated December 3, 1878; application filed May 1, 1878.

*To all whom it may concern:*

Be it known that I, FLOYD HEAVENER, of Laramie City, in the county of Albany, Wyoming Territory, have invented a new and Improved Clothes-Line Reel; and I do hereby declare that the following is a full, clear, and exact description of the same, reference being had to the accompanying drawing, forming part of this specification, in which—

Figure 1:
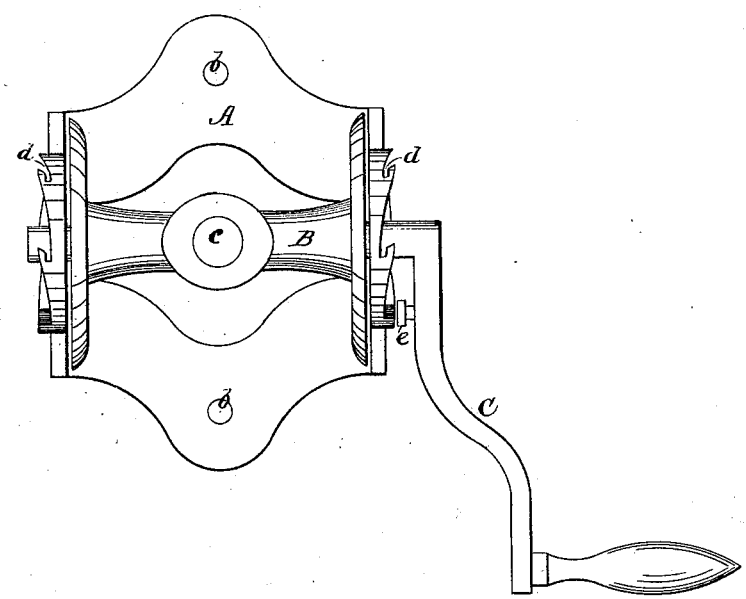
Figure 2:
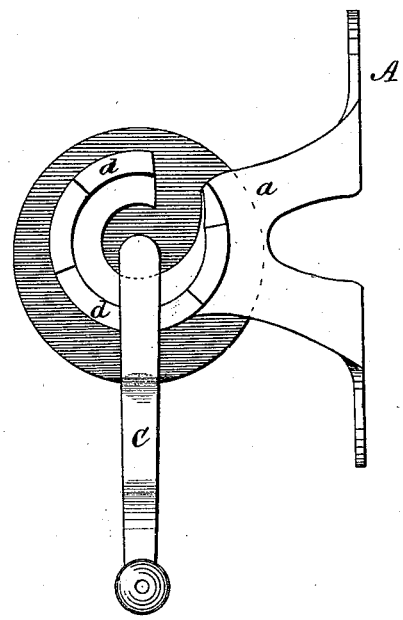

Figure 1 is a front, and Fig. 2 a side, view.

My invention relates to an improved clothes-line reel, designed to wind up the clothes-line when it is to be taken into the house, and to stretch the same taut when disposed for use.

The invention consists in forming the supporting-bracket with open-slotted bearings, to permit the removal of the reel, and with a concentric series of laterally-projecting ratchet-teeth around said bearings, which are adapted to engage with a locking device on the crank-handle.

The invention also further consists in making the laterally-projecting ratchet-teeth and the locking-edge of the handle of a hook shape, to correspond and fit into each other, so that when the ratchet-teeth are engaged by said locking-edge the spool cannot become disengaged by longitudinal movement on its axis.

In the drawing, A represents the supporting-frame, which is made in the form of a bracket, with ears $a$, to form bearings, and screw-holes $b$, for attaching the same to a fence or building. These ears $a$ have open-slotted bearings, in which rest the journals of the spool, and from which bearings the said spool is readily removable.

B is the spool, which is cast in one piece with the crank-handle C, and is provided with a central perforation or eye, $c$, in the middle portion of its shaft, to permit the clothes-line to be attached thereto, so as to wind without turning loosely upon the same.

To hold the spool to its adjustment when it is wound up and the clothes-line drawn taut, I form upon the outer side of each of the ears $a$ a series of ratchet-teeth, $d$, and upon the arm of the crank-handle is formed a locking-edge, which may be either in the form of a stud, $e$, as shown, or a longitudinal rib, which the tension of the clothes-line holds against the ratchets upon the supporting-frame.

To prevent the locking-edge from accidentally slipping off the ratchets, both the ratchets and locking-edge are made hook-shaped upon their binding-edges, so that longitudinal movement of the spool is prevented, and the spool can only be released by first turning it backward until the hook of the edge $e$ shall be clear of the hook of the ratchet-tooth.

It will be seen that the ratchet-teeth $d$ are arranged upon the outside surface of both ears.

The object in duplicating said teeth is to permit the handle to be arranged upon either side of the frame by simply reversing the spool, thus adapting the device to the various corners or angles of the fence or building upon which it may be desired to locate the same.

This device, it will be seen, is simply and cheaply formed of but two pieces of metal, and forms a convenient and efficient means for holding and tightening the end of a clothes-line.

Having thus described my invention, what I claim as new is—

1. The spool B, having a crank-handle, with locking device $e$, in combination with the supporting-frame, having open-slotted bearings, surrounded by a concentric series of laterally-projecting ratchet-teeth, as described.

2. The supporting-frame having a series of hook-shaped ratchet-teeth, combined with the crank-handle of the spool, having a locking device adapted to engage with said locking-teeth, substantially as described.

FLOYD HEAVENER.

Witnesses:
N. L. ANDREWS,
ROBT. W. BAXTER, Jr.